US012091990B2

(12) United States Patent
McCrea et al.

(10) Patent No.: US 12,091,990 B2
(45) Date of Patent: Sep. 17, 2024

(54) METHOD FOR PROVIDING A GAS TURBINE BLADE AND ROTOR WEAR-PROTECTION SYSTEM

(71) Applicant: Integran Technologies Inc., Mississauga (CA)

(72) Inventors: Jonathan McCrea, Toronto (CA); Gino Palumbo, Toronto (CA); Klaus Tomantschger, Mississauga (CA); David Lionel Limoges, Etobicoke (CA)

(73) Assignee: Integran Techi ologies Inc., Mississauga (CA)

( * ) Notice: Subject to any disclaimer, the term of this patent is extended or adjusted under 35 U.S.C. 154(b) by 0 days.

(21) Appl. No.: 18/101,835

(22) Filed: Jan. 26, 2023

(65) Prior Publication Data

US 2023/0184120 A1 Jun. 15, 2023

Related U.S. Application Data

(63) Continuation of application No. 17/123,355, filed on Dec. 16, 2020, now Pat. No. 11,591,919.

(51) Int. Cl.
*F01D 5/30* (2006.01)

(52) U.S. Cl.
CPC ......... *F01D 5/3007* (2013.01); *F01D 5/3092* (2013.01); *F05D 2220/32* (2013.01); *F05D 2230/31* (2013.01); *F05D 2230/60* (2013.01); *F05D 2240/24* (2013.01)

(58) Field of Classification Search
None
See application file for complete search history.

(56) References Cited

U.S. PATENT DOCUMENTS 3,690,065 A * 9/1972 Bucalo ...................... F03G 7/06
252/79.4
5,160,243 A 11/1992 Herzner et al.
5,240,375 A 8/1993 Wayte
5,320,719 A 6/1994 Lasbmore et al.
5,352,266 A 10/1994 Erb et al.
5,433,797 A 7/1995 Erb et al.
6,132,175 A 10/2000 Cai et al.
6,431,835 B1 8/2002 Kolodziej et al.
6,547,944 B2 4/2003 Schreiber et al.
(Continued)

FOREIGN PATENT DOCUMENTS

CA 2056519 7/1992

OTHER PUBLICATIONS

International Search Report and Written Opinion of PCT/CA2021/051607 dated Feb. 18, 2022, 8 pages.

*Primary Examiner* — Kayla Mccaffrey
(74) *Attorney, Agent, or Firm* — Rankin, Hill & Clark LLP

(57) ABSTRACT

Sacrificial inserts for use in gas turbine engines to reduce friction and wear damage between compressor fan blades and the fan rotors are disclosed. The consumable metallic shims have low friction and reduce fretting and galling on fan blade roots and fan rotor dovetail slots thereby increasing their operating lives, as well as reduce engine noise and improve engine efficiency. The electroformed, compliant, multi-purpose shims may have variable thickness and, when positioned between the blade dovetail root and the rotor disk dovetail slot, prevent movement and slippage between air foil blades and the rotor.

31 Claims, 3 Drawing Sheets

(56) References Cited

U.S. PATENT DOCUMENTS

| | | | |
|---|---|---|---|
| 8,282,356 | B2 | 10/2012 | Cairo |
| 8,309,233 | B2 | 11/2012 | Facchini et al. |
| 8,367,217 | B2 | 2/2013 | Gonzalez et al. |
| 8,672,634 | B2 | 3/2014 | Parkos et al. |
| 8,871,297 | B2 | 10/2014 | Barnett et al. |
| 8,906,515 | B2 | 12/2014 | Tomantschger et al. |
| 9,005,420 | B2 | 4/2015 | Tomantschger et al. |
| 9,249,521 | B2 | 2/2016 | Tomantschger et al. |
| 9,970,120 | B2 | 5/2018 | Tomantschger et al. |
| 10,337,336 | B2 | 7/2019 | Mantel |
| 10,519,788 | B2 | 12/2019 | Li et al. |
| 2002/0044870 | A1 | 4/2002 | Simonetti et al. |
| 2005/0205425 | A1 | 9/2005 | Palumbo et al. |

* cited by examiner

METHOD FOR PROVIDING A GAS TURBINE BLADE AND ROTOR WEAR-PROTECTION SYSTEM

CROSS REFERENCE TO RELATED APPLICATIONS

The present invention is a continuation of U.S. application Ser. No. 17/123,355 filed Dec. 16, 2020, the disclosure of which is incorporated herein in its entirety.

FIELD OF THE INVENTION

This invention is directed to metallic, anisotropic, form-fitting, variable thickness, sacrificial shims positioned between compressor blades and the fan rotor in gas-turbines used in aerospace and electrical power generation applications. The novel shims are designed to increase the operational life and efficiency of the engine while reducing noise.

BACKGROUND OF THE INVENTION

Gas turbine engines compress air to about seventeen times the atmospheric pressure using multiple compressor stages. Each compressor stage comprises a plurality of rotor blades mounted on the circumference of the rotor wheel. Compressor and turbine blade speeds keep increasing in gas turbine engines due to the reduced number of highly loaded stages employed in modern designs. When the fan turns at low speeds, e.g., by wind action with the engine off, the fan blade does not generate sufficient centrifugal loading to prevent rocking of the fan blade root in the rotor root slot due to the loose fit between the two components. The relative movement between the root section of the fan blade and the corresponding blade root slot on the rotor typically causes fretting wear and/or galling in the contact areas on both components. Some materials systems, such as one titanium part contacting another titanium part, as commonly used in fan blades and rotors of jet engines are particularly susceptible to such damage. To extend the service life, shims have traditionally been inserted between the root section of fan blades and their respective blade slots in the rotor fan hub of turbofan engines.

A number of approaches to reduce the wear between the root section of the fan blade and the corresponding blade root slot on the rotor have been disclosed in the prior art:

Herzner et. al. in U.S. Pat. No. 5,160,243 (1992) describes a turbine blade wear protection system comprising metallic shims attached to the dovetail of turbine or compressor blades. The shim reduces frictionally induced wear damage to the rotor. The multi-component shims are interposed between the blade dovetail root and the disk dovetail slot so that they do not readily slip relative to the root or rotor, however, they do slip relative to each other. The “multilayer shim” comprises at least two separate components which can move relative to each other, i.e., the two layers are not attached to each other. The individual layers can optionally be reinforced or contain a coating. The shims are designed to confine fretting to the consumable portions of shim, and therefore the disk dovetail slot and the mating blade dovetails are not subject to surface degradation with corresponding reduction in fatigue capability. The anti-fretting layer is made of a material that does not induce fretting or other type of fatigue damage in titanium and titanium alloys, e.g., phosphor bronze, optionally heat treated to provide at least 12% elongation and a tensile strength of at least 80,000 psi.

Other suitable materials include copper-nickel alloys, aluminum-bronze alloys and copper-beryllium alloys.

Kolodziej et. al. in U.S. Pat. No. 6,431,835 (2002) describes a compliant shim for use between the root of a gas turbine fan blade and a dovetail groove in a gas turbine rotor disk to reduce fretting there between. The compliant shim has first and second slots for engaging tabs extending from the fan blade root. The slots and tabs cooperate to hold the shim in place during engine operation. Shims are made of a cobalt alloy and are heat treated in air to form a thin oxidation layer on their outer surface.

Li et. al. in U.S. Pat. No. 10,519,788 (2019) describes a composite airfoil, formed of a polymeric matrix composite, a ceramic matrix composite, or carbon based materials, comprising a leading edge and a trailing edge, a pressure side and a suction side extending between the leading edge and the trailing edge, a tip at a radial outer end of the airfoil, a shank at a radial inner end of the airfoil, a dovetail connected to the shank. Disposed between the dovetail and the shank are a metal patch, a wear strip and a shim. The metal patch may be of constant thickness or varying thickness and can be formed of a single material or two materials and may have a soft side and a hard side. Materials suitable for use as metal patch include various sheet metals such as stainless steel, titanium, Inconel and other known materials suitable for use in a gas turbine engine environment. The optional wear strip provides a low friction coating. Shims are made of steel, Ti or its alloys, or Cu or its alloys. Shims can also be bi-metallic having a first material coated with a second material such as a steel or steel alloy coated with a copper or copper alloy on one or more sides to provide a relatively hard material on one side and a relatively soft material on the opposite side.

Barnett et. al. in U.S. Pat. No. 8,871,297 (2014) describes a method of applying a nanocrystalline coating to a gas turbine engine component. The method comprises the steps of applying an intermediate bond coat to at least a portion of the component, and then applying the nanocrystalline coating, e.g., made of Ni, Cu, Co—P, Co, Cr, Fe, Mo, Ti, W, and Zr, to at least the portion of the component overtop of the intermediate bond coat. The component may include, for example, a blade of which a dovetail portion of the blade root is protected by applying the intermediate bond coat and the nanocrystalline coating thereto.

SUMMARY OF THE INVENTION

Manufacturers of advanced gas turbine engines seek to design and develop engines with increased efficiency, reliability and reduced life cycle cost. As discussed above the prior art discloses various means of applying various spacers/shims to the contact area between the airfoil blade dovetail root and the rotor disk dovetail slot to reduce friction and wear and to prolong the service life. The present invention describes improved metallic spacers/shims for use in gas turbines used in aerospace applications and land-based installations. When the wear life of shims according to the present invention is reached, the engine can be readily refurbished not requiring the expensive rotor to be scrapped or reworked.

It is therefore an objective of the present invention to increase the operation life of gas turbine engines increasing the required inspection and/or service intervals.

It is another objective of the present invention to reduce the life cycle cost of gas turbines by reducing the number of parts and the assembly time required to install fan blades on the rotor rim.

It is another objective of the present invention to reduce fan blade root and fan rotor slot wear, including, but not limited to galling, fretting and fretting fatigue by reducing the relative movement between the fan blade root and the rotor slot caused by differences in thermal expansion between the contacting parts, vibrational motion, and/or varying centrifugal loads.

It is another objective of the present invention to decrease dovetail slot air leakage to enhance the engine performance and efficiency by reducing the gaps around and under the airfoil dovetails.

It is another objective of the present invention to provide shims having a varying thickness to minimize the gap between the fan dovetail root to rotor dovetail slot.

It is another objective of the present invention to provide shims having high strength, high ductility and high heat resistance.

It is another objective of the present invention to provide shims providing high vibration damping.

It is another objective of the present invention to provide shims having, at least in part, a lubricious outer surface layer to reduce wear.

It is another objective of the present invention to provide shims having an outer surface with a low surface roughness.

It is another objective of the present invention to provide shims having a volume wear loss of a 6 mm ball made of a first material representing the outer surface composition of the rotor dovetail slot and/or a second material representing the outer surface composition of the airfoil root rubbing against a disk made of a third material representing the outer surface composition of the metallic shim's wear layer of less than 8 $mm^3/Nm \times 10^{-5}$, preferably less 4 $mm^3/Nm \times 10^{-5}$, more preferably less than 2 $mm^3/Nm \times 10^{-5}$, and most preferably less than 1 $mm^3/Nm \times 10^{-5}$, when subjected to the pin-on-disk testing in accordance with ASTM G99 ("Standard Test Method for Wear Testing with a Pin-on-Disk Apparatus") at an applied load of 10N, a sliding speed of 10 cm/s, a wear track radius of 10 mm, a sliding distance of 100 m, at ambient atmosphere, at room temperature and without lubrication.

It is another objective of the present invention to provide shims designed to confine wear predominantly to a consumable surface layer of the shim and not the rotor dovetail slot or the fan blade root.

It is another objective of the present invention to provide shims having anisotropic material properties in their transverse and/or longitudinal cross sections to optimize the durability and performance.

It is another objective of the present invention to reduce engine noise.

According to one aspect of the invention, a machine assembly is provided, comprising:

(i) a first machine component having an outer surface defining a first mating feature, the outer surface of the first machine component composed of a first material;

(ii) a second machine component having an outer surface defining a second mating feature at least partially matingly received into the first mating feature, the outer surface of the second machine component composed of second material; and (iii) an interface component disposed between and directly contacting the first and second mating features, the interface component including an outer surface composed of a third material, wherein the first material and/or the second material is a metallic alloy of Ti, wherein the third material is a metallic alloy of Co and provides a lubricious and sacrificial surface layer on at least part of the outer surface of the interface component to a depth of at least 10 μm.

According to another aspect of the invention, a machine assembly is provided, comprising:

(i) a first machine component having an outer surface composed of a first material; and (ii) a second machine component having an outer surface composed of second material and configured to mate with the first machine component;

where in a mating area between the first machine component and the second machine component an interface area is created in the outer surface of one of the first machine component and the second machine component, wherein at least one of the first material and the second material is a metallic alloy of Ti, wherein at least part of the interface area is coated with a third material which is a metallic alloy of Co such that the mating area has, in part, the metallic alloy of Ti opposing the metallic alloy of Co; and wherein the third material provides a lubricious surface layer on at least part of the interface area to a depth of at least 10 μm.

More particularly, according to another aspect of the invention, an assembly for a gas turbine engine is provided, comprising:

(i) a fan rotor having multiple dovetail shaped slots in the circumference thereof, an outer surface of the fan rotor defining the dovetail shaped slots made of a first material;

(ii) fan blades having dovetail shaped roots shaped to fit into the dovetail shaped slots of the fan rotor, an outer surface of each of the dovetail shaped roots made of a second material; and (iii) metallic shims disposed between the fan blade dovetail shaped roots and the fan rotor dovetail shaped slots, each metallic shim comprising:

a variable thickness along a longitudinal cross-section and/or a transversal cross-section of the metallic shim to minimize a void space between each of the fan rotor dovetail shaped slot and the fan blade dovetail shaped root;

an outer surface made, at least in part, of a third material;

a shim core surrounded, in part, by the outer surface of the metallic shim and made of a fourth material; and wherein the outer surface of each metallic shim contacts the outer surface of the fan blade dovetail shaped root and the outer surface of the fan rotor, the third material providing a lubricious and sacrificial surface layer on at least part of the outer surface of the metallic shim to a depth of at least 10 μm, the third material wearing preferentially when rubbed against the first material and/or the second material.

According to another aspect of the invention, a method of protecting fan blades having dovetail shaped roots from wear against dovetail shaped slots defined in a circumference of a fan rotor of a gas turbine engine is provided, the method comprising the steps of:

(i) electrodepositing a metallic material on a temporary mandrel in an electrolyte solution to form a metallic shim by passing an electric current between the temporary mandrel and a counter-electrode; and (ii) inserting the metallic shims between the dovetail shaped roots of the fan blades and their respective dovetail shaped slots in the circumference of the fan rotor to prevent direct contact between the fan blades and the fan rotor.

Air Foil and Rotor Specifications:

Air foils and rotors are commonly made of Ti or Ti alloys having a hardness in the range of 250-1500 VHN for parts exposed to moderate temperature (e.g. compressors) and Ni alloys with a hardness between 400 and 500 VHN in the high temperature sections (e.g. turbines).

Titanium alloys provide high strength and low density, resulting in excellent strength-to-weight and life-to-weight ratios. Lower Young's modulus and lower coefficient of thermal expansion (compared to other alloys used in aerospace engine design) as well as their remarkable corrosion resistance also contribute to their preferred properties. Most Ti alloys exhibit good ductility and are weldable and forgeable. Ti alloys widely used in aerospace engine rotor designs include, but are not limited to, Ti 6-4 (Ti-6% Al-4% V) a medium strength alloy with good tensile properties, creep resistance and high fatigue strength at temperatures up to 325° C., Ti 6-2-4-6 (Ti-6% Al-2% Sn-4% Zr-6% Mo) a high strength alloy which can be used to operating temperatures up to 450° C., Ti 6-2-4-2 (Ti-6% Al-2% Sn-4% Zr-2% Mo-0.08% Si) an alloy (hardness ~350 VHN) with good tensile and creep properties to operating temperatures up to 540° C., however, is susceptible to creep fatigue failure under dwell loading below 200° C., and IMI834 (Ti-5.8% Al-4% Sn-3.5% Zr-0.7% Nb-0.5% Mo-0.35% Si—0.6% C) an alloy which offers increased tensile strength and creep resistance to operating temperatures up to 600° C. combined with acceptable fatigue strength.

Al, Co, Fe and Ni based alloys are also employed in gas turbine engines. More recently, composite parts are being increasingly used in gas turbine engines, e.g., reinforced polymer materials including, but not limited to, carbon fiber reinforced polymers (CFRP), which are optionally metal coated on the outer surface. The polymer base can be a thermoset (e.g., epoxy) or a variety of suitable thermoplastics, including, but not limited to thermoplastic polyolefins (TPOs) including polyethylene (PE) and polypropylene (PP); polyamides, mineral filled polyamide resin composites; polyphthalamides, polyphthalates, polystyrene, polysulfone, polyimides; neoprenes; polybutadienes; polyisoprenes; butadiene-styrene copolymers; poly-ether-ether-ketone (PEEK); polycarbonates; polyesters; liquid crystal polymers such as partially crystalline aromatic polyesters based on p-hydroxybenzoic acid and related monomers; polycarbonates; acrylonitrile-butadiene-styrene (ABS); chlorinated polymers such polyvinyl chloride (PVC); and fluorinated polymers. The use of 3D printed parts is contemplated as well, which can include glass fiber and/or carbon fiber reinforced poly-aryl-ether-ketones (PAEKs).

Due to the material properties of polymeric materials and CFRPs, preferably the entire airfoil is encapsulated in metallic layer, e.g., a grain-refined metal, as described by Tomantschger et. al. in U.S. Pat. No. 8,906,515 (2014), assigned to the Applicant of the present application. In this case also, to avoid the wear of the expensive fan rotor dovetail slots, shims according to the present specification can be employed.

Electroform/Coating Shim Specification:

Although gas turbine manufactures know what geometry of the fan blade root and rotor slot is required to enhance the service life, degradation of the contact areas at edges of the interface between the blade root and the slot of the disk still occurs. Shims are therefore still used to avoid micro-slipping and micro-cracking although no macroscopic motion may occur. The novel shims described in this disclosure are therefore designed to further reduce high cycle fatigue, low cycle fatigue and micro-slip failure modes.

The net-shape, electroformed metallic shims according to the present specification comprise at least one outer surface composition and at least one core composition. The outer surface composition can gradually change to the core composition; the two compositions can be distinct layers and/or a combination of both. In its simplest form, the shim has a uniform chemical composition (the outer surface composition is equal to the core composition). The outer surface may also comprise one or more chemical compositions abruptly or gradually changing from one to the other, e.g., a lubricious, sacrificial surface composition may be present in the areas of contact and high wear between the fan blade and the rotor whereas another composition may be present in areas less prone to wear although in general it is most economic to provide a uniform outer surface over the entire shim surface.

The outer surface and/or the core of the shims may comprise at least one metal selected from the group consisting of Co, Cr, Cu, Fe, Mn, Mo, Ni, Sn, V, W, and Zn. In addition, the electroformed shim's outer surface and/or the core may be an alloy containing at least one element from the list above. In addition, metallic materials used in the outer surface and/or the core of the shims may further comprise alloying elements selected from the group consisting of B, C, P, S and Si. When the air foil root surface and the rotor dovetail slot surface comprises Ti a particularly preferred outer surface material for the shim is Co.

The metal and metal alloys which are electrodeposited may further comprise particulate additions, referred to herein as metal matrix composites (MMCs), to improve the physical characteristics of the metallic material, particularly near the shims outer surface. The particulate additives are incorporated into the metal or metal alloy during the electroplating process by, for example, suspending the particles in the plating solution so that the particles become entrapped in the electrodeposited metal or metal alloy to a depth of at least 10 μm, preferably at least 25 μm and more preferably to at least 50 μm. Suitable particulate additives include metal powders, metal alloy powders, metal oxide powders, nitrides, various forms of carbon (carbon black, carbon nanotubes, diamond, graphite, graphite fibers, and graphene), carbides, lubricants such as various forms of carbon, $MoS_2$, and organic materials such as polyolefins and polytetrafluoroethylene (PTFE). Suitable metal oxides include oxides of Al, Co, Cu, Mg, Ni, Si, Sn, V, and Zn. Suitable nitrides are nitrides of Al, B, C and Si. Suitable carbides include carbides of B, Cr, Bi, Si and W. Lubricious additions therefore can form an integral part of the outer surface layer of the shim as opposed to applying a lubricating agent to the outer surface of the shim and/or airfoil and/or root, although, if desired a solid or liquid lubricant can also be applied in addition to the use of a lubricious outer metallic coating layer.

Due to the various requirements of the shim, the desired mechanical properties can best met with a non-homogeneous approach and in one preferred embodiment of this invention the shims comprise non-isotropic material properties along their length and/or circumference. In another preferred embodiment of this invention the shims comprise non-isotropic material properties on and near (closer to) the outer surface when compared to the core and in another preferred embodiment of this invention the shims have uniform, isotropic properties.

Depending on the location in the gas turbine engine, shims are exposed to various operating temperatures which affect the material properties, including but not limited to, the Young's modulus/stiffness. Depending on the location of the shims in the jet engine, operating temperatures may be kept below about 150° C., in the range 400° C. to 700° C. or in the range of 500° C. to as high as 1,500° C.

As discussed in the background section, the prior art suggests to use, e.g., multilayer shims comprising two or more metal sheets cut and bent to shape with an optional coating in selected areas. This adds complexity and cost to the manufacturing, assembly and inspection of gas turbine engines which is undesired. The various components of the shim may rely on the physical restriction of the air gap between the fan blade root and rotor dovetail to keep them in place, they may be bonded using adhesives or potentially spot-welded or brazed. Contrary to the prior art, shims described in this specification are not formed from commercial rolled metal sheet feet stock having uniform thickness but are net shaped electroformed to the desired shape, cross-section and thickness. This approach can take into account the cross-section, shape and size of the air gaps of engines of varying size from various manufacturers and provide a single piece shim with a compliant fit having anisotropic material properties and a varying thickness (e.g., along a longitudinal/length cross-section and/or a transversal/width cross-section of the shims) to minimize the air gap and provide the best fit attainable. The cross-sectional thickness of the shims along its width and/or length, depending, on the engine size and specific parts used, may range from about 25 μm to 2.5 mm, more typically in the range of 50 μm to 500 μm and the minimum cross-sectional thickness may be limited to ≤90%, ≤75%, ≤50% or as much as ≤25% of its maximum cross-sectional thickness.

The material properties, including but not limited to, composition, microstructure and lubricity of the shims according to this invention, are selected to reflect the particular application, specifically the composition and mechanical properties of the airfoil root and rotor slot being contacted. Preferably, the hardness of the novel shims, particular on the outer surface is lower than the hardness of the air foil root and/or rotor slot in the contacting area if the objective is to provide a "sacrificial" shim which wears away during use to minimize damage of the expensive airfoil roots and the expensive rotor. As the hardness of the air foil root and rotor slot may be different, shims according to the present invention may therefore have a specific hardness on the outer surface contacting the air foil root, while having another, different hardness, on the outer surface contacting the rotor root, and having yet another hardness in and near the core of the shim. When two materials with different hardness rub against each other typically the material with the lower hardness preferentially wears away. Therefore, in one preferred embodiment, the hardness of the contact layer on the shim is at least 20 VHN, preferably at least 50 VHN lower than the respective hardness of the mating layer on the air foil or rotor. For instance, in the case of Ti alloys, such as Ti 6-2-4-2 having a hardness of ~350 VHN, at least the contact surface on the shim may have a hardness of ≤300 VHN while the core of the shim may have a hardness≥400 VHN. Under certain circumstances, however, the surface layer of the shim can have a hardness which is equal to or greater than the hardness of the mating surface on the fan blade or rotor, i.e., at least 20 VHN higher, preferably at least 50 VHN higher than the respective hardness of the mating layer on the air foil or rotor. The Applicants of the invention have surprisingly discovered that, e.g., when Ti containing alloys are mating with grain-refined, electroformed Co containing alloys, the wear loss on the Ti alloys is greatly reduced even when the Ti containing alloys are softer or of similar hardness than the Co alloys they rub against.

To reduce friction in selected areas on or near the outer surface of the shim, e.g., the air foil root and/or rotor slot in the contacting areas optionally can include a lubricant such as a carbon based material, a polymer material (PTFE or silicone) containing F and/or Si, $MoS_2$, and the like. In addition, grain-refinement can be used to reduce the coefficient of friction of metallic materials, e.g., in the case of Ni rubbing against Ni the unlubricated static and sliding coefficient of friction (COF) is about 0.7-0.9 (average grain-size>50 μm), the COF drops to about 0.4 for an average grain-size of about 50 nm and down to about 0.2 for an average grain-size below 25 nm. Electroless Ni, an amorphous Ni—P alloy, has a static and sliding COF of about 0.2. As a reference the unlubricated static and sliding COF of Ti-6Al-4V against Ti-6Al-4V is between 0.3 and 0.4.

The static and/or sliding coefficient of friction of the outer layer of the shim in at least the areas contacting the fan blade root and/or the fan rotor slot should be as low as practical, e.g., less than about 0.5, preferably less than 0.3 and more preferably at or below 0.2 and most preferably at or below 0.1 when sliding against the material of the fan blade and/or the rotor it is contacting, which also depends on the contact pressure and sliding speed.

The surface roughness of the shims, the fan blade root and the fan rotor slots are preferably kept low, i.e., $R_a \leq 1$ μm, preferably ≤0.25 μm and more preferably ≤0.1 μm.

If only a fraction of the exposed outer surface of the shim receives the lubricious, soft, sacrificial coating it may be advantageous to apply the layer by selective plating, e.g., as described by Tomantschger et. al. in U.S. Pat. No. 9,249,521 (2016) and 9,970,120 (2018), both assigned to the Applicant of the present application. This technique can also be used to refurbish the shims described herein as a convenient method to replace/repair the sacrificial wear layer on the shims.

The core of the inventive shims and/or surface areas not in contact with the fan blade root and fan rotor dovetail slots, on the other hand, may be selected to be as hard, stiff and/or strong as possible/desirable to resist deformation. For instance, grain refined metallic materials can be used with a hardness of ≥200 VHN, preferably ≥300 VHN, preferably ≥400 VHN, more preferably ≥500 VHN and ≥600 VHN. It is worth noting that shim core materials with high compression strength are required to withstand the forces generated during engine operation. Material testing at high applied loads revealed that, when compared to shim core materials with high strength, shim core materials with lower strength were prone to premature compression failure in this highly loaded area vs the stronger materials.

The metallic shim formed, in accordance with this invention, may also have a non-uniform thickness along its length and/or circumference in order to minimize the air gap between the fan blade root and the fan rotor slot as much as possible and be compliant with the fan blade root. Sections particularly prone to wear or corrosion preferably comprise a coating composition specifically selected to enhance the service life.

The Applicants have determined that due to the relative thin cross-section and the complex nature of the shim, an ideal shim can neither be fabricated using rolled metal sheets of uniform thickness as starting materials which are shaped and cut to size, nor by machining shims out of a solid metal block. The Applicants have recognized that generally net shape forming the novel shims using known electroplating/electroforming techniques on a suitably shaped temporary mandrel; on the other hand, provides an elegant way to economically produce novel shims of varying thickness.

Definitions

The term "gas-turbine engine" as used herein means a combustion engine employing gas as the working fluid consisting of a compressor, a combustion chamber, and a turbine where air taken from the atmosphere is compressed and then fed into a combustion chamber where fuel is added and burned to turn a turbine.

As used herein, the term "fan blade", "compressor blade", and "air foil" means a part having the cross-sectional shape of a wing used as a propeller or as part of a gas turbine engine.

As used herein, "compressor rotor", "compressor disk" and "fan rotor" means a rotating wheel having slots on its outer periphery for mounting fan blades.

The term "shim" or "spacer" as used herein means a thin metallic strip inserted between two mating parts to fill in the space between them which is used to align parts, improve the fit, and/or reduce wear, e.g., between fan blades and the compressor rotor slots on a gas-turbine engine.

The term "galling" as used herein to a combination of friction and adhesion between two surfaces under load, followed by slipping and tearing of the crystal structure beneath the surface resulting in material torn from one surface and getting stuck or even friction welded to the adjacent surface.

The term "fretting" as used herein refers to wear process that occurs at the contact area between two materials under load and subject to minute relative motion by vibration or some other force degrading the surface layer quality producing increased surface roughness and micro pits.

The term "lubricants" as used herein refers to material additions made between two surfaces to lower the friction between mating material surfaces to reduce wear, fretting, galling and oxidation.

As used herein, the terms "metal", "alloy" and "metallic material" means crystalline and/or amorphous structures where atoms are chemically bonded to each other and in which mobile valence electrons are shared among atoms. Metals and alloys are electric conductors; they are malleable and lustrous materials and typically form positive ions. Metallic materials include Ni—P, Co—P, Ni—Co—P, and Fe—P.

As used herein, the term "metallic coating" or "metallic layer" means a metallic deposit/layer applied to part of or the entire exposed surface of an article and adhering to the surface of the article.

As used herein, the term "metal matrix composite" (MMC) is defined as particulate matter embedded in a metal matrix. MMCs can be produced, e.g., by suspending particles in a suitable plating bath and incorporating particulate matter into the deposit by inclusion.

As used herein the term "laminate" or "nano-laminate" means a metallic coating that includes a plurality of adjacent metallic sub-layers, each of which has an individual layer thickness between 1.5 nm and 1 μm.

As used herein "layer" means a single thickness of a substance where the substance may be defined by a distinct composition, microstructure, crystal phase, grain-size, and any other physical or chemical property. It should be appreciated that the interface between adjacent layers may not be necessarily discrete but may be blended, i.e., the adjacent layers may gradually transition from one of the adjacent layers to the other of the adjacent layers.

As used herein, the term "coating thickness" or "layer thickness" refers to the depth in the deposition direction and typical thicknesses meet or exceed 10 μm, preferably 25 μm, more preferably 150 μm and up to 10 mm.

As used herein, the term "electroplating" or "electrodeposition" refers to an electrolytic metal deposition process in which metal ions from the electrolyte solution are cathodically reduced and deposited on the surface of a workpiece by the passage of electric current.

As used herein, the term "surface" or "outer surface" refers to all accessible surface area of an object accessible to the atmosphere and/or a fluid.

As used herein, the term "exposed surface area" refers to the summation of all the areas of an article accessible to a fluid.

As used herein, the terms "surface roughness", "surface texture" and "surface topography" mean a regular and/or an irregular surface topography containing surface structures. These surface irregularities/surface structures combine to form the "surface texture".

As used herein the term "smooth surface" means a surface having a surface roughness ($R_a$) less than or equal to 1 μm.

As used herein the term components "made of a first material", "made of a second material" and/or "made of a third material" means the outer surface of the components which are in physical contact with each other and subject to wear are made of a specific material. It is understood that the core of the fan rotor, the fan blades and/or the metallic shims (i.e., components) may be made of the same or a different material.

As used herein, the term "electrolytic cell" means an apparatus comprising two electrodes, namely a working electrode and a counter electrode submersed in a common electrolyte. The electrolytic cell can be used as an electroplating cell or as an electropolishing cell.

As used herein, the term "selective plating" means an electroplating process whereby not the entire surface of the workpiece is coated or whereby not the entire surface of the workpiece is coated at once. In this context, the term selective plating is defined as a method of selectively electroplating localized areas of a workpiece without submersing the entire article into a plating tank. Selective plating techniques are particularly suited for repairing or refurbishing articles, as they do not require the disassembly of the system containing the workpiece to be plated.

As used herein, the term "anode" and "cathode" mean the respective electrodes in an electrolytic cell submersed in the common electrolyte and subject to an electrical potential.

BRIEF DESCRIPTION OF THE DRAWINGS

In order to better illustrate the invention by way of examples, descriptions are provided for suitable embodiments of the method/process/apparatus according to the invention in which.

DETAILED DESCRIPTION OF THE INVENTION

Figure 1:
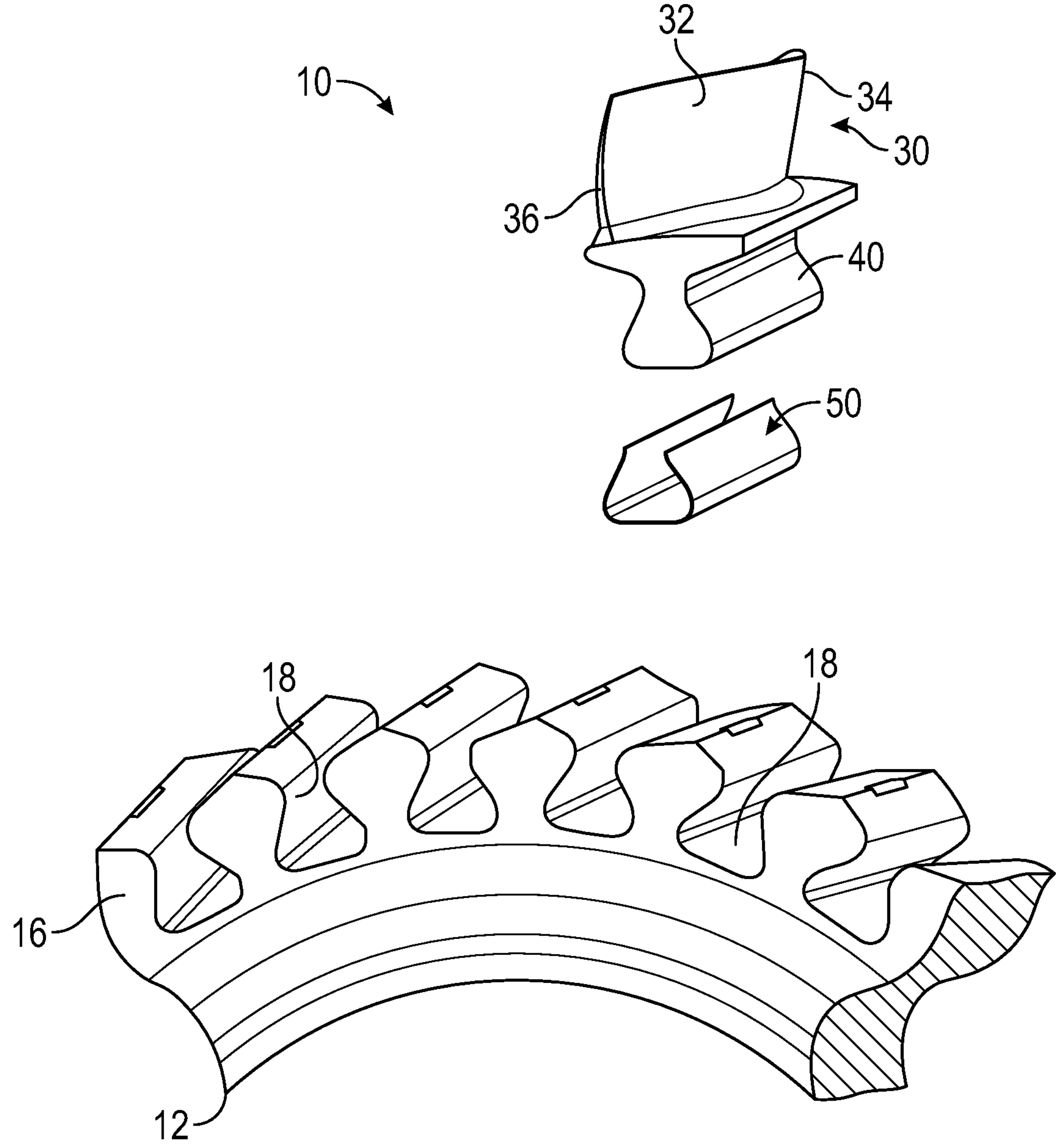
FIG. 1 is a partial exploded perspective view of a rotor assembly including a fan rotor, and fan blade and a compliant shim contemplated by the present invention.

FIG. 1 illustrates a fan assembly 10 including a section of a fan disk or rotor 12 of a gas turbine engine capable of receiving a plurality of fan blades 30 held in place by shims 50 according to the present disclosure. Specifically, the fan rotor 12 comprises, on it an outer periphery 16 made of a first material, a plurality of dovetail shaped grooves or slots 18. The slots 18 extend through the outer periphery 16 at an angle between the rotor's axial and tangential axes referred to as disk slot angle. The slots 18 are designed to receive the fan blades 30. Each fan blade 30 includes a radially upstanding airfoil portion 32 that extends from an airfoil leading edge 34 to an airfoil trailing edge 36. Each fan blade also comprises a root or root portion 40 made of a second material which is dovetail shaped to be received by the fan rotor slots 18. The fan rotor 12 and the fan blades 30 are typically made from Ti or Ti alloys, although the use of other materials is contemplated as well. Specifically, the fan blades 30 can be made of lightweight composite materials including carbon fiber reinforced polymers (CFRP) or CFRP cores coated with a metallic material layer, including, but not limited to, nanocrystalline metallic materials. The exemplary compliant shims 50 are used to firmly secure each fan blade 30 in its corresponding fan rotor slot 18.

Figure 2:
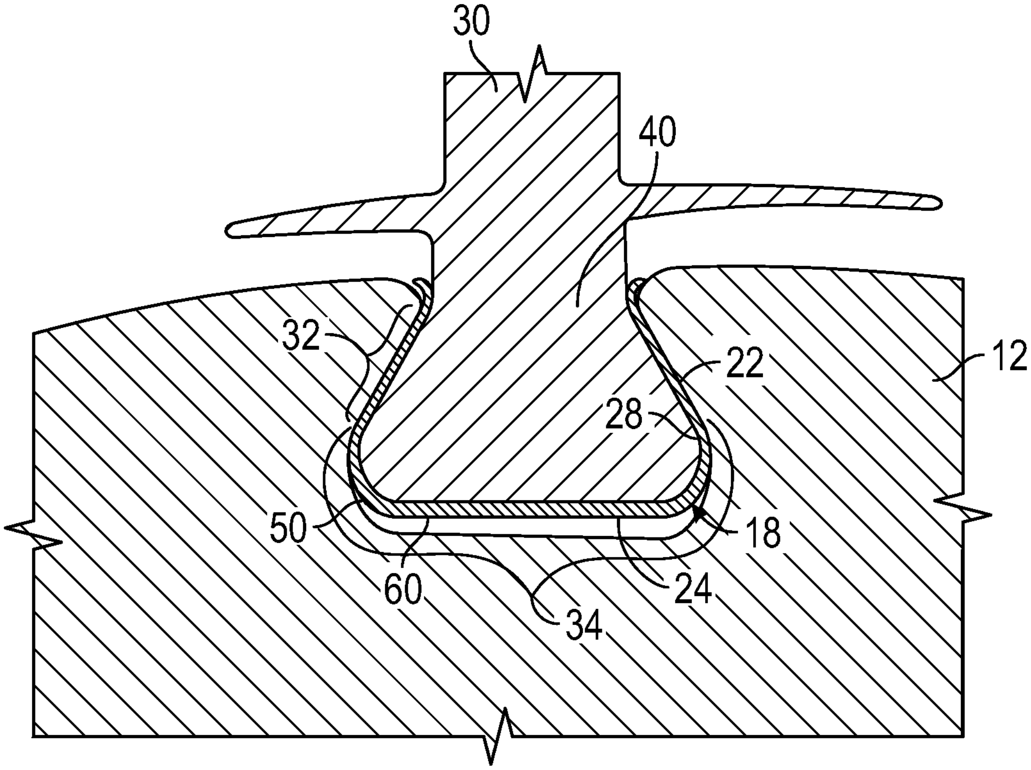
FIG. 2 is a cross-sectional view of a portion of the assembled rotor assembly with the compliant shim positioned between the fan rotor and fan blade.

One of the fan blades 30 mounted in one of the slots 18 of the fan rotor 12 with the shim 50 there between is illustrated in greater detail in the cross-sectional view in FIG. 2. Each fan rotor slot 18 is defined by sloping side walls 22 diverging in a direction from the circumference toward the inward portion of the fan rotor, terminating at a bottom 24. Each fan blade 30 has at its lower end the root portion 40 with sides 28 sloping outward in a direction from the blade body to the dovetail bottom. The root portion 40 is configured and sized to slide into the fan rotor slot 18, as shown in FIG. 2.

As indicated in FIG. 2 there is not a perfect fit between the fan blade root portion 40 and the fan rotor slot 18 creating a small air gap 60 between the side walls 22 and the sides 28 of the root portion 40 which is reduced by placement of the exemplary shim 50. The air gap 60 changes depending on whether or not the engine is operating and depends the rotation speed, and with increased operating time the air gap 60 tends to widen due to wear. The air gap 60 typically isn't uniform throughout its entire cross-section and typically is smaller at the sides and larger at the bottom which requires a perfectly conforming shim to be thinner at the sides and thicker at the bottom to achieve the best fit and minimize the air gap. Minimizing the air gap 60 therefore cannot be achieved with a conventional shim made of a rolled metal sheet of uniform thickness. In addition, an anti-fretting and/or anti-galling coating and/or layer, if applied, is placed at the sides increasing the overall thickness at the sides which limits minimizing the air gap.

When the engine is not in operation, the bottom of the root portion 40 may contact the bottom of the fan rotor slot 18. When the jet engine operates, rotation of the fan rotor 12 generates a centrifugal force which results in movement of each fan blade 30 radially in an outward direction. Consequently, the side 28 of the root portion 40 applies forces against the side wall 22 defining the fan rotor slot 18. The sliding motion of the fan blade root portion 40 combined with the root portion contact pressure and the coefficient of friction (COF) produce shearing forces on both the side wall 22 and the root portion side 28 creating a loaded contact region over the area identified by numeral 32. In contrast, a non-contact region is formed in the area indicated by numeral 34 between the root portion side 28 and the bottom wall 24 defining the fan rotor slot 18 where the loaded contact, by comparison to the side walls in region 32, is small.

As the jet engine operates from rest, through flight operations, and then again to rest, constituting what is generally referred to as a "cycle", each fan blade 30 is pulled in the outward direction with varying loads. Therefore the side 28 of the root portion 40 and the side wall 22 repeatedly slide past each other by a small distance (<0.25 mm), however, that can nevertheless cause fretting fatigue damage with time. Of most concern is the damage to the fan rotor 12 as small cracks form after repeated cycles. Such cracks can extend into the fan rotor 12 from the side wall 22 and can ultimately lead to failure of the fan rotor.

According to the invention, the wear and fatigue damage that would otherwise occur at the pressure faces because of the sliding motion at the sides 28 of the root portion 40 and the side walls 22 of the fan rotor 12 is reduced by inserting the exemplary shim 50 as reinforcement between the root portion 40 and the side wall 22 and the bottom wall 24 defining the fan rotor slot 18 as indicated in FIG. 2.

The novel, compliant shim 50 is a thin metal sheet formed so that it attaches to the fan blade root portion 40 and is retained during service between the root portion 40 and at least the fan rotor slot side wall 22. The form of the shim 50 is generally a constricted U-shape, with the upper portion of the legs of the U turned slightly toward each other. The shim 50 is sufficiently long that it extends around the bottom of the root portion 40 and at least over the entire contacting surface 32 between the root portion 40 and the fan rotor slot side walls 22, completely separating the sides 28 and the side walls 22 so that they cannot contact each other along the contacting surface 32. The wall thickness of the conforming shim 50 varies to provide an excellent fit between the root portion 40 and the fan rotor slot 18, thereby minimizing the air gap 60 as stated. The fan blades are typically mounted in the fan rotor by first attaching a compliant shim onto each fan blade and sliding the blade/shim assembly into the fan rotor slot in the conventional manner.

The surface of the shim 50 contacting the fan blade root portion 40 and the fan rotor slot 18 typically are softer than the respective materials of the root portion and fan rotor to ensure any material loss due to wear occurs preferentially on the shim preserving/extending the use of the expensive fan blades and rotor. As stated, frequently Ti alloys are used for both fan blades and fan rotors requiring the metallic shim contacting surface to be composed of a material which minimizes wear and friction with Ti and its alloys. The Applicants have surprisingly discovered that grain-refined Co and Co alloys are particularly suited to meet this requirement.

In one embodiment, unlike prior art shims which are made of rolled metal sheet, the exemplary shims 50 are net-shaped electroformed to the exact shape and thickness required. The novel shims are an-isotropic across at least its cross-section and optionally along its length to meet the various material property requirements at various locations along the shims' lengths and sides. For instance, an anti-fretting layer is formed in the mating areas of the root portion 40 and the fan rotor slot 18 as indicated as area 32 in FIG. 2 experiencing high forces during engine operation, subject to high wear. Optionally, the anti-fretting layer is also formed in the mating areas of the root portion 40 and the fan rotor slot 18 as indicated as area 34 in FIG. 2 experiencing less contact/friction and, as indicated, it may be beneficial to surround the entire outer surface of the shim with the anti-fretting layer.

In one preferred embodiment the fan blade 30 is made of CFRP and encapsulated in grain-refined Ni and/or Co comprising metallic material (hardness ~400-650 VHN) whereas the side wall 22 and the bottom wall 24 defining the fan rotor slots 18 are made of a Ti alloy (hardness ~300-400 VHN). The shim core can also be made of a grain-refined Ni and/or Co comprising metallic material (10-100 nm grain-size, hardness 300-650 VHN) and the sacrificial wear layers on both sides in areas 32 and 34 can comprise a coarser-grained Ni and/or Co metallic material (100-500 nm grain-size, hardness of ≥300 VHN) with P as alloying element. Electroforming an isotropic shim and converting the outer surface to an oxide layer by chemical or electrochemical means is within the objects of this invention as well.

Figure 3:
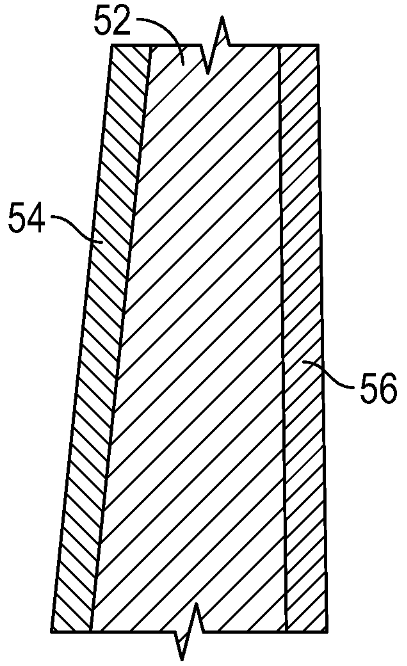
FIG. 3 is a cross-sectional view of the compliant shim in a loaded contact region, contemplated by the present invention.

FIG. 3 illustrates a cross-section of the novel shim 50 in the loaded contact region 32 of FIG. 2 displaying the wear layer 54 adjacent to the side wall 22 of the fan rotor and the wear layer 56 adjacent to the root portion 40 of the airfoil, made of a third material, and the core 52, made of a forth material. Wear layers 54 and 56 can be of similar or different thickness, and depending on the first material representing the outer surface of the fan rotor slot side wall 22 and the second material representing the outer surface of the root portion 40, can be of the same or different chemical composition. In addition, wear layers 54 and 56 can contain solid lubricants and/or comprise a surface oxide layer, e.g., formed by an appropriate surface oxidation treatment or formed with time by exposure to ambient air.

Figure 4:
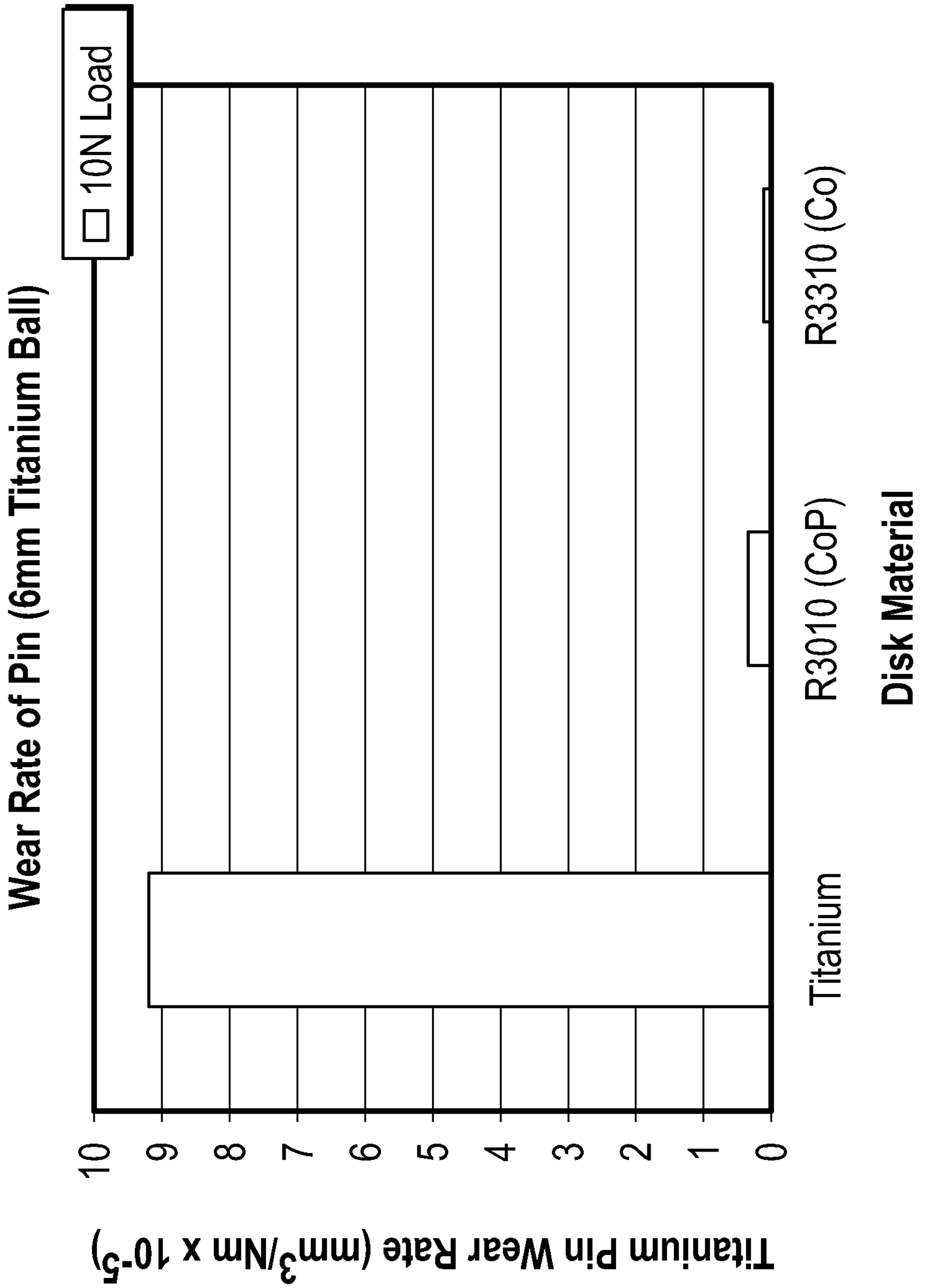
FIG. 4 is a graph showing wear rates of a titanium pin when sliding against different metallic disk materials as determined by pin-on-disk testing in accordance with ASTM G99.

FIG. 4 illustrates the unlubricated sliding wear loss of a 6 mm Ti ball against disks made from three materials: Ti6Al4V (polycrystalline, hardness: 350 VHN), electrodeposited grain-refined Co-2% per weight P (average grain-size: 20 nm, hardness: 540 VHN), and electrodeposited grain-refined Co (average grain-size: 20 nm, hardness: 400 VHN). Specifically, the pin-on-disk testing was performed in accordance with ASTM G99 ("Standard Test Method for Wear Testing with a Pin-on-Disk Apparatus") using the following testing parameters: (i) a 6 mm diameter ball (Titanium), (ii) an applied load of 10N, (iii) a sliding speed of 10 cm/s, (iv) a wear track radius of 10 mm, (v) a sliding distance of 100 m, (vi) no lubrication, and (vii) ambient atmosphere at room temperature.

4 the wear rate for electrodeposited metallic materials comprising Co is reduced by over 90% compared to Ti.

Table 1 is a representation of the same and additional data also providing hardness information which reveals, that in the case of disks made from grain-refined Co materials, drastically reduced wear rates are measured although the hardness of the Co2P disk (540 VHN) is 160 VHN greater than the one of the Ti ball (380 VHN). Pure n-Co of similar hardness than Ti causes even less wear on the Ti ball. Surprisingly, Ni containing materials of similar hardness behave much poorer than Co based materials. Table 1 data clearly demonstrate that the unlubricated Co comprising disk/Ti pin material pair results in a very low material wear loss on both the disk and the Ti ball. For the electroformed Co plates tested there was virtually no wear on the Ti pin compared to the other material pairs. The coefficient of friction of the Co materials was also the lowest although it did not vary much between the samples and ranged between 0.3 and 0.5.

The data reveal unexpectedly that metallic materials comprising Co and/or P, even when their hardness exceeds the hardness of metallic materials comprising Ti these materials are mated with, surprisingly provide a superior material combination in any applications subject to wear, well beyond the use of shims as described herein. Such applications, include but are not limited to drive shafts, connector pins, gears, and brackets.

TABLE 1

Wear loss of a 6 mm Ti ball (380 VHN) on disk materials (unlubricated) of various composition and hardness (10N load)

| Disk Material | Ti6Al4V | SS 304 | n-Ni | n-NiCo | n-Co2% P | n-Co |
|---|---|---|---|---|---|---|
| Hardness [VHN] | 350 | 200 | 400 | 520 | 540 | 400 |
| Ti Pin Wear [$mm^3/Nm \times 10^{-5}$] | 9.1 | 43 | 62 | 46 | 0.3 | 0.1 |

Table 2 expands the wear data of FIG. 1 by providing the wear loss of the disks in addition to the wear loss of the Ti ball revealing that both the Ti pin and the unlubricated wear loss of disks comprising Co are drastically reduced compared to Ti pin/Ti disk wear loss. The data show that the volume wear loss of the Ti pin, representing the first material of the fan rotor slot 18 and/or the second material of the airfoil root portion 40 is lower than the wear loss of the third material of the disk comprising Co representing the consumable outer surface of the shim 50 as intended to achieve the desired extension of the rotor and/or airfoil life without the need of refurbishment or replacement.

TABLE 2

Wear loss of 6 mm Ti ball on varius disk materials (10N load)

| Pin Material/hardness | Ti Pin Wear [$mm^3/Nm \times 10^{-5}$] | Disk/Shim Material/Hardness | Disk/Shim Wear [$mm^3/Nm \times 10^{-5}$] |
|---|---|---|---|
| Ti (380 VHN) | 9.1 | Ti (380 VHN) | 8.5 |
| Ti (380 VHN) | 0.3 | n-Co2% P (540 VHN) | 1.4 |
| Ti (380 VHN) | 0.1 | n-Co (400 VHN) | 2.9 |

The volume wear loss ($mm^3/Nm \times 10^{-5}$) of both the Ti pin and the disk (shim material) was calculated from the input test parameters, the wear track area (measured in the plane perpendicular to the sliding direction), and the volume wear loss of the static partner. As is evident from the data in FIG.

From the teachings of the present application, the person skilled in the art of electrodeposition/electroforming will know what metallic materials are suited for forming shims taking into consideration the material composition of the airfoil root portion and the fan rotor. Electrodeposition of metallic materials, including, but not limited to, nanocrystalline coatings is described by Erb et. al. in U.S. Pat. No. 5,352,266 (1994) and in U.S. Pat. No. 5,433,797 (1995), and Palumbo et. al. in U.S. Pat. Appl. No. 2005/0205425, all assigned to the Applicant of the present application.

The person skilled in the art of electrodeposition/electroforming will also know how to conveniently form layered, nano-laminated and/or graded shims in a single electrolyte solution having an individual layer thickness between 1.5 nm and 1 μm, preferably between 25 nm and 500 nm, and more preferably between 100 nm and 250 nm, as described by Lashmore et. al. in U.S. Pat. No. 5,320,719 (1994), Schreiber et. al. in U.S. Pat. No. 6,547,944 (2003), and Tomantschger et. al. in U.S. Pat. No. 9,005,420 (2015), by suitably varying the electrodeposition conditions.

Specifically, Tomantschger et. al. in U.S. Pat. No. 9,005,420 (2015), assigned to the Applicant of the present application, describes an elegant way to mass-produce a variable property deposit. The metallic layers formed can comprise fine-grained metallic materials, optionally containing solid particulates dispersed therein. The electrodeposition conditions in a single plating cell are suitably adjusted to once or repeatedly vary at least one property in the deposition direction and/or along the length of the workpiece. In one embodiment denoted multi-dimensional grading, property variation along the length and/or width of the deposit is described. Variable property metallic material deposits can be used to provide superior overall mechanical properties compared to monolithic metallic material deposits. This techniques also allows the preparation of an exemplary shim 50 with a soft, lubricious, anti-fretting and anti-galling surface including particulate matters on and near the outer surface while providing a strong, hard and particulate-free core, by using the degree of solution agitation to vary the particulate inclusion in the metallic layer and modulating the electrical current to adjust the composition, hardness and strength of the layer, all while using a single electrolyte and electroplating tank. Similarly, any suitable layering can be achieved to further optimize the physical properties of the electroformed shim as can be a non-uniform cross-section in the transversal or longitudinal direction of the deposited metallic layer by appropriate placement and use of ancillary anodes, current thieves and shields.

Facchini et. al. in U.S. Pat. No. 8,309,233 (2012), assigned to the Applicant of this application, specifically discloses the electrodeposition of conforming, fine-grained and/or amorphous metallic layers, coatings or patches comprising Co onto suitable substrates or to electroforming free-standing, fine-grained and/or amorphous metallic materials comprising Co.

Alloys comprising Co, Ni and P can be conveniently electroformed with Co and/or Ni contents ranging from 5% to 95% per weight, and a P content ranging between 0.05% and 5% per weight in average grain sizes ranging from 10 nm to 50 μm. In one preferred embodiment the Co content of the alloy is at least 50% per weight, preferably at least 60% per weight, more preferably at least 70% per weight and most preferably at least 80% per weight, the P content of the alloy is at least 0.05% per weight, preferably at least 0.1% per weight, more preferably at least 0.5% per weight and most preferably at least 1% per weight, and the hardness is at least 300 VHN, preferably at least 350 VHN, more preferably at least 400 VHN and most preferably at least 500 VHN. Accordingly, over the composition and grain-size range of interest the hardness can be in the range of 100 VHN to 700 VHN. The addition of particulates, e.g., lubricants, provides a further tool to dial in almost any material property desired.

The specifications of all disclosures above are incorporated herein by reference.

The person skilled in the art of material science will appreciate that increased material strength can be achieved through grain-size reduction. Since some ductility is generally required in at least selected areas of the shims of this invention, microcrystalline or nanocrystalline coatings are generally preferred over amorphous deposits. Depending on the specific circumstance, however, graded, layered or nano-laminated sections may provide suitable mechanical properties. Incorporating a sufficient volume fraction of particulates can also be used to further enhance the material properties.

The person skilled in the art will know that various DC and pulse electrodeposition plating schedules can be used. They include periodic pulse reversal, a bipolar waveform alternating between cathodic pulses and anodic pulses. Anodic pulses can be introduced into the waveform before, after or in between the on-pulse(s) and/or before, after or during the off time(s). The anodic pulse current density is generally equal to or greater than the cathodic current density. The anodic charge ($Q_{anodic}$) of the "reverse pulse" per cycle is always smaller than the cathodic charge ($Q_{cathodic}$).

Table 3 below lists various properties of electrodeposited, grain-refined alloy groups commercially available from Integran Technologies Inc., of Mississauga, Ontario, Canada in comparison with a Ti-alloy commonly used in aerospace applications.

TABLE 3

Properties of electroformed Co materials (compared to a popular Ti alloy)

| Property/Material | Ti6Al4V Grade 5 STA | Nanovate N1200 Series (n-NiCo) | Nanovate R3000 Series (n-Co) | Nanovate R3010 Series (n-CoP) |
|---|---|---|---|---|
| Yield Strength (MPa) | 1100 | 500-1200 | 800-1600 | 1500-1600 |
| Tensile Strength (MPa) | 1170 | 800-1700 | 1400-2000 | 2000 |
| Elastic Modulus (GPa) | 114 | 150-160 | 130-140 | 130 |
| Ductility [%] | 10 | 5-20 | 5-20 | 4-7 |
| Hardness [VHN] | 396 | 250-530 | 380-560 | 540 |
| Service Temperature [° C.] | — | up to 375 | 150-375 | up to 375 |

The net-shaped exemplary shims having a non-uniform thickness profile and anisotropic material properties can be formed using a reusable cathode mandrel by the appropriate selection and placement of consumable or inert anodes and the use of shields in the counter-electrode assembly notwithstanding post-plate machining and/or polishing operations may still be used to form the final product. The temporary mandrel used as cathode to electrodeposit the shim is shaped according to the desired form and dimensions of the shim. Shims are electroformed to the desired shape, thickness and composition as a solid piece and removed from the electroplating solution. Alternatively, it may be practical to electroplate the shims directly onto airfoil roots. It is undesirable, however, to apply an intermediate bond coat to the airfoil root such as electroless Ni, as this may increase the wear with Ti parts compared to Co coatings as is evident from the data in Table 1.

Optionally, the outer surface of the exemplary shim can be machined, ground, lapped and or polished while still attached to the reusable mandrel to prevent any deformation and maintain its shape before it is removed from the reusable mandrel. In contrast to conventional shims formed from sheet metal sheet feed stock, no bending/shaping is required as electroformed shims can be formed in the desired shape and form. The person skilled in the art will appreciate that it may be desirable to produce shims having a transverse cross-section which is slightly more bent than the corresponding air foil blade root in order for the shim to snap and hold onto the root.

The cross-sectional thickness of the exemplary shims along its width (transverse direction) and/or length (longitudinal direction), depending, on the engine size and specific parts used, may range from about 0.025 mm to 2.5 mm, more typically in the range of 0.05 mm to 1 mm and, the minimum cross-sectional thickness may be ≤5%, ≤10%, ≤25%, ≤50% or as much as ≤75% of the maximum cross-sectional thickness.

It is also possible in the practice of this invention to electrodeposit age-hardenable metallic shims, e.g., by adding P to the alloy. The strength and thermal stability of such shims may be increased by a subsequent heat-treatment according to known procedures.

VARIATIONS

The foregoing description of the invention has been presented describing certain operable and preferred embodiments. It is not intended that the invention should be so limited since variations and modifications thereof will be obvious to those skilled in the art, all of which are within the spirit and scope of the invention.

The invention claimed is:

1. A method of protecting a fan blade having a dovetail shaped root from wear against a dovetail shaped slot defined in a circumference of a fan rotor of a gas turbine engine, the method comprising:

(i) electrodepositing a metallic material on a temporary mandrel in an electrolyte solution to form a unitary, one-piece metallic shim by passing an electric current between the temporary mandrel and a counter-electrode; and (ii) inserting the metallic shim between the dovetail shaped root of the fan blade and the dovetail shaped slot in the circumference of the fan rotor to decrease dovetail slot air leakage, wherein wear is predominantly confined to a consumable outer surface layer of the metallic shim and not the dovetail shaped root of the fan blade and/or the dovetail shaped slot in the circumference of the fan rotor.

2. The method of claim 1, wherein the electrodeposition conditions are selected to deposit a grain-refined metallic material on the temporary mandrel.

3. The method of claim 2, wherein the grain-refined metallic material comprises Co.

4. The method of claim 2, wherein the grain-refined metallic material has an average grain-size of between 10 nm and 1 μm.

5. The method of claim 1, wherein the electrodeposition conditions are selected to deposit the metallic material in an non-isotropic form on the temporary mandrel.

6. The method of claim 1, wherein the metallic shim comprises a shim core covered, at least in part, by an outer surface made of a material with a composition differing from a composition of the shim core.

7. The method of claim 6, wherein the outer surface and/or the core of the metallic shim comprises at least one element selected from the group consisting of Co, Cr, Cu, Fe, Mn, Mo, Ni, Si, Sn, V, W, Zn, F, C, N, S, and P.

8. The method of claim 6, wherein the outer surface and/or the core of the metallic shim comprises at least one metal and further contains at least one alloying element selected from the group consisting of B, C, P and S.

9. The method of claim 1, wherein the electrodeposition conditions are selected to co-deposit a particulate addition in the metallic material.

10. The method of claim 9, wherein the particulate addition is selected from the group consisting of metal powders, metal alloy powders, metal oxide powders, nitrides, carbon, carbides, silicone, inorganic oxides lubricants, and organic lubricants.

11. The method of claim 9, wherein the particulate addition comprises carbon.

12. The method of claim 11, wherein the particulate addition is selected from the group consisting of carbon black, carbon nanotubes, diamond, graphite, graphite fibers, graphene and carbides.

13. The method of claim 9, wherein the particulate addition comprises a lubricant and is present to a depth of at least 10 microns from an outer surface of the metallic shim.

14. The method of claim 1, wherein an outer surface of the dovetail shaped root and an outer surface of the fan rotor defining the dovetail shaped slot comprises a material selected from the group consisting of Ti, Al, Ni, Co and carbon comprising composites.

15. The method of claim 14, wherein the outer surface dovetail shaped root and the outer surface of the fan rotor defining the dovetail shaped slot comprise Ti.

16. The method of claim 1, wherein an outer surface of the inserted metallic shim contacts an outer surface of the dovetail shaped root and an outer surface of the fan rotor defining the dovetail shaped slot to prevent direct contact between the fan blade and the fan rotor.

17. The method of claim 1, wherein the cross-sectional form of the metallic shim is a constricted U-shape.

18. An assembly for a gas turbine engine, comprising:

(i) a fan rotor having a dovetail shaped slot in the circumference thereof, an outer surface of the fan rotor defining said dovetail shaped slot made of a first material comprising Ti;

(ii) a fan blade having a dovetail shaped root shaped to fit into the dovetail shaped slot of the fan rotor, an outer surface of the dovetail shaped root made of a second material comprising Ti; and (iii) a metallic shim disposed between the fan blade dovetail shaped root and the fan rotor dovetail shaped slot to decrease dovetail slot air leakage, the metallic shim comprising an outer surface made, at least in part, of a third material comprising grain-refined Co of higher hardness than said first and second material;

wherein the outer surface of the metallic shim contacts the outer surface of the fan blade dovetail shaped root and the outer surface of the fan rotor dovetail shaped slot, the third material providing a lubricious and sacrificial surface layer on at least part of the outer surface of the metallic shim, the third material wearing preferentially when rubbed against the first material and/or the second material.

19. The assembly of claim 18, wherein the third material is present to a depth of at least 10 μm from the outer surface of the metallic shim.

20. The assembly of claim 18, wherein the third material comprises at least 0.05% per weight of P.

21. The assembly of claim 18, wherein the metallic shim comprises a shim core surrounded, in part, by the outer surface of the metallic shim and made of a fourth material.

22. The assembly of claim 21, wherein the fourth material comprises at least one element selected from the group consisting of Co, Cr, Cu, Fe, Mo, Ni, Si, Sn V, W, Zn, F, C, N, S and P.

23. The assembly of claim 22, wherein the fourth material is grain-refined.

24. The assembly of claim 23, wherein the third material and the fourth material comprise at least 10% per weight of Co.

25. The assembly of claim 24, wherein the fourth material comprises at least 0.05% per weight of P.

26. The assembly of claim 21, wherein the third material and/or the fourth material comprises at least one particulate addition selected from the group consisting of molybdenum disulfide, titanium nitride, boron nitride, a carbon-based material, polytetrafluoroethylene, silicone, and inorganic oxides.

27. The assembly of claim 18, wherein the third material surrounds the entire outer surface of the shim.

28. The assembly of claim 18, wherein at least areas of contact between the first material, the second material, and the third material are covered with a lubricant film.

29. The assembly of claim 28, wherein the lubricant is selected from the group consisting of $MoS_2$, a carbon-based material, and a polymeric material containing F and/or Si.

30. The assembly of claim 18, wherein the third material comprises grained-refined Co in the range of 5-95% per weight, Ni in the range of 5-95% per weight and P in the range of 0.05-5% per weight.

31. The assembly of claim 18, wherein a volume wear loss of the first material and/or the second material rubbing against the third material is less than 8 $mm^3/Nm \times 10^{-5}$ when subjected to an associated pin-on-disk testing in accordance with ASTM G99.

* * * * *